June 22, 1965  E. W. BUSHNELL  3,190,403
SLACK ADJUSTER

Filed Nov. 29, 1963  2 Sheets-Sheet 2

Witness:
C. Bassett

INVENTOR.
Eldon W. Bushnell
BY
Walter L. Schlegel Jr
Atty.

United States Patent Office 3,190,403
Patented June 22, 1965

3,190,403
SLACK ADJUSTER
Eldon Wayne Bushnell, Lansing, Ill., assignor to Amsted Industries Incorporated, Chicago, Ill., a corporation of New Jersey
Filed Nov. 29, 1963, Ser. No. 326,833
3 Claims. (Cl. 188—196)

This invention relates to an automatic slack adjuster adapted for use on self-contained package tread brake mechanisms of the type employed on railway passenger cars to decelerate a wheel and axle assembly.

Briefly, the present invention contemplates the provision of a self-contained package tread brake mechanism adapted to be secured to the frame of a railway car truck and embodying a brake shoe connected to a brake lever which is actuated by a power cylinder to frictionally engage the brake shoe against the tread surface of a wheel. To limit movement of the brake shoe relative to the wheel tread, as the shoe becomes worn, an automatic slack adjuster is provided between the brake lever and the shoe.

An object of the present invention resides in the provision of a self-contained package tread brake mechanism embodying a slack adjuster automatically operable responsive to wear of the brake shoe to limit the distance the shoe moves from its braking position to its brake release position.

Another object of the invention resides in the provision of an automatic slack adjuster embodying a pawl and ratchet operable to rotate a nut to move an adjusting screw axially responsive to wear of the brake shoe to decrease the spacing between the shoe and the wheel tread when the shoe is in its retracted position.

A further object of the invention resides in the provision of an automatic slack adjuster in which the pawl is disengaged from the ratchet teeth as the brake shoe approaches its brake release position, to thereby permit manual rotation of the ratchet to adjust the position of the brake shoe relative to the wheel tread surface.

The invention embodies other novel features, details of construction and arrangement of parts which are hereinafter set forth in the specification and claims and illustrated in the drawings, forming part thereof, wherein:

Figure 1:
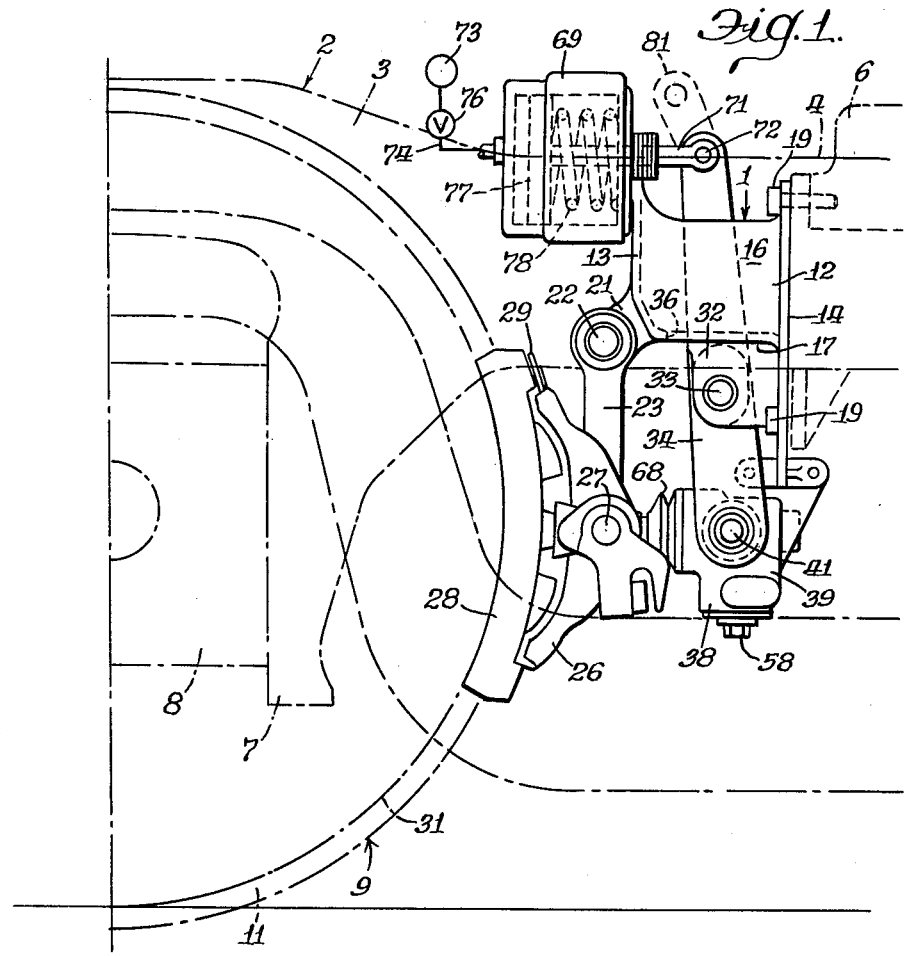
FIGURE 1 is a side elevation showing a self-contained package tread brake mechanism provided with an automatic slack adjuster embodying features of the invention.
Figure 2:
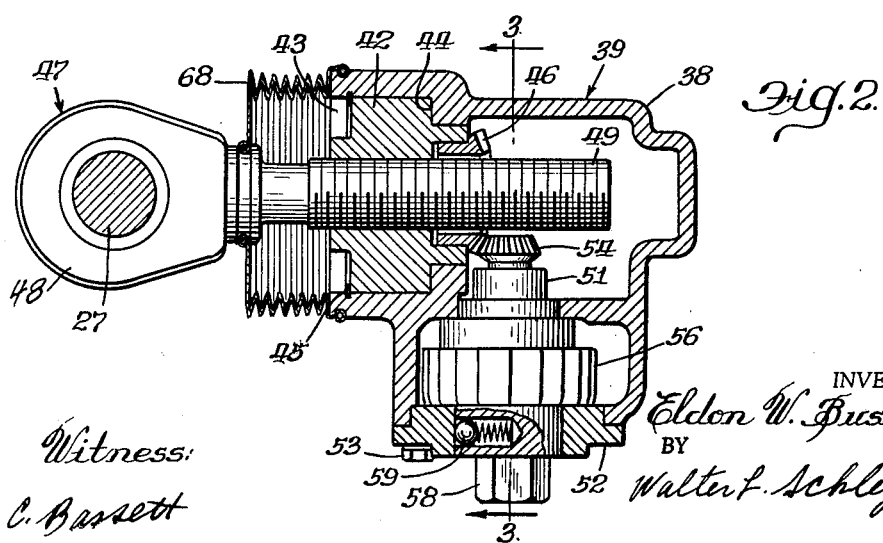
FIGURE 2 is a longitudinal section illustrating the slack adjuster.
Figure 3:
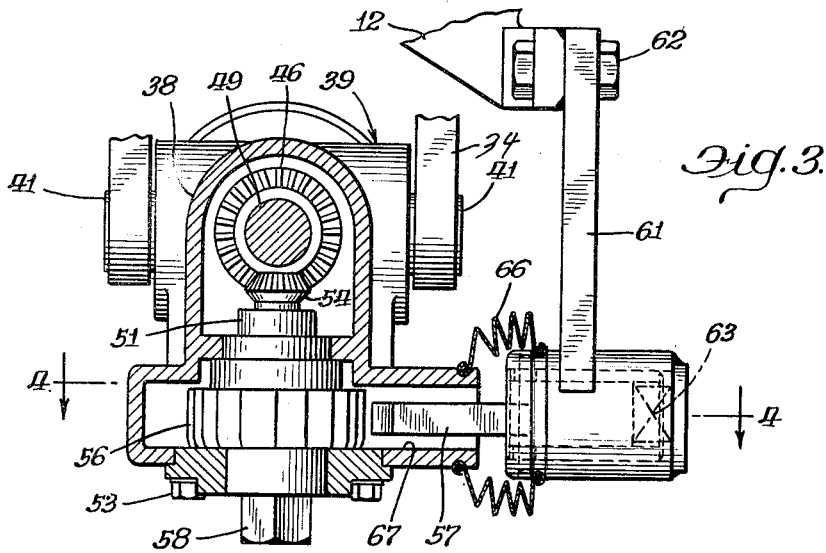
FIGURE 3 is a transverse section taken along the line 3—3 of FIGURE 2.
Figure 4:
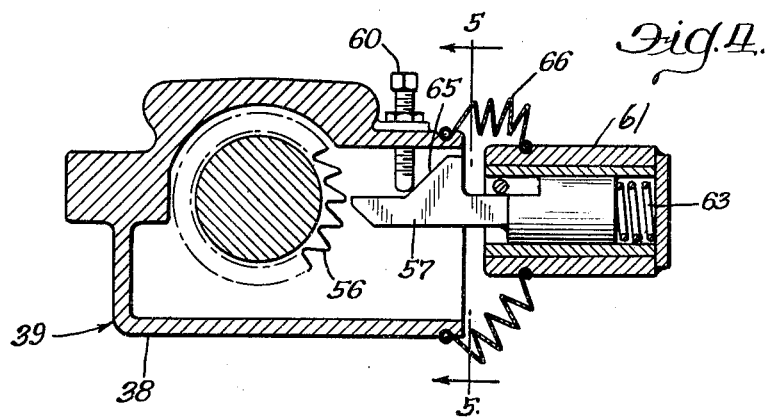
FIGURE 4 is a section taken along the line 4—4 of FIGURE 3.
Figure 5:
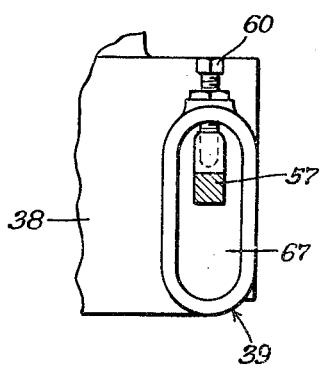
FIGURE 5 is a fragmentary section taken along the line 5—5 of FIGURE 4.

Referring now to the drawings for a better understanding of the invention, a slack adjuster embodying features of the invention is shown as employed on a self-contained tread brake mechanism 1 of the type disclosed in United States Patent No. 3,093,214 which is incorporated herein by reference.

The brake mechanism 1 is shown as arranged on a railway car truck 2 embodying a truck frame 3 having side rails 4 interconnected by transoms 6, the side rails having pedestal jaws 7 adjacent their ends to receive journal boxes 8 having wheel and axle assemblies 9 journaled therein. On a conventional four wheel railway passenger car truck, it will be understood that a brake mechanism 1 is provided for each wheel 11.

The brake mechanism 1 is shown as comprising a brake bracket 12 having front and back walls 13 and 14 interconnected by side walls 16 and a bottom wall 17, the back wall 14 being secured to a transom 6 by means of cap screws 19. A pair of spaced hanger support lugs 21 projects forwardly from the front wall 13 to receive the upper end of a hanger 23 therebetween, the hanger being pivotally connected to the lugs by means of a pivot pin 22. A brake head 26 is pivotally connected to the lower end of the hanger 23 by means of a pin 27. A brake shoe 28, detachably secured to the brake head 26 by means of a conventional key 29, is adapted to be moved into and out of engagement with the tread surface 31 of the wheel 11.

A brake lever 34 extends vertically through a slot 36 in the bottom wall 17 and is pivotally mounted intermediate its ends on a pivot pin 33 which extends through aligned openings formed in spaced gussets 32 on the bracket 12 below the bottom wall 17. The lower end of the brake lever 34 is bifurcated and formed with aligned bearing openings to receive trunnions 41 provided on opposite sides of a housing 38 of a slack adjuster device 39.

An internally threaded adjusting nut 42, mounted for rotational movement in a passage 43 in the housing 38, is engaged against axial movement between an abutment shoulder 44 and a split ring retainer 45. The inner end of the nut 42 is formed with a cylindrical bore to snugly receive the hub portion of a driven bevel gear 46, the gear being secured against movement relative to the nut by means of pins or set screws.

An adjustment screw 47 is formed with an eye portion 48 and a threaded shank 49, the eye portion being pivotally connected to the brake head 26 by means of the bolt 27, and the shank being in threaded engagement with the adjusting nut 42. A rotatable ratchet member 51 is journaled at its inner end in the housing 38 and is journaled at its outer end on a cover 52 secured to the housing by screws 53. A driving bevel gear 54 is fixed on the inner end of the ratchet member 51 for meshing engagement with the driven bevel gear 46.

The member 51 is provided with ratchet teeth 56 adapted to be engaged by the inner end of a pawl 57. To permit manual rotation, the ratchet member 51 is formed with a hexagonal boss 58 adapted to be engaged by a wrench. To resist accidental rotation, the member 51 is provided with a spring-pressed ball 59 frictionaly engaging the cover.

The pawl 57 is mounted for axial movement in a pawl support bracket 61 secured to the brake bracket 12 by bolts 62. A helical compression spring 63 is mounted on the bracket 61 to yieldably resist axial movement of the pawl 57 away from the ratchet member 51. An abutment screw 60 is threaded through the housing 38 for engagement against an inclined cam surface 65 formed on the pawl 57, whereby the pawl is disengaged from the ratchet teeth 56 during movement of the housing toward its brake release position, to thereby permit manual rotation of the ratchet member 51 to adjust the position of the brake shoe 28 relative to the wheel tread surface 31.

A resilient boot 66 is connected at its ends to the housing 38 and bracket 61 to prevent the passage of dirt or water through the pawl opening 67 in the housing. A similar resilient boot 68 is connected at its ends to the shank 49 and the housing 38 to prevent the passage of foreign material into the housing.

A power cylinder 69, secured to the upper end of the front wall 13 by means of studs and nuts, is provided with a piston rod 71 pivotally connected to the upper end of the brake lever 34 by a pivot pin 72. The cylinder is connected to a source 73 of pressurized fluid by a conduit 74 having a three way control valve 76 therein. The rod 71 is secured to a piston 77 slidably mounted in the cylinder 69 and biased to its retracted position by a helical compression spring 78.

In the operation of the self-contained brake mechanism thus shown and described, pressurized fluid passing into the cylinder 69 from the conduit 74 causes the piston 77 to pivot the brake lever 34 in a clockwise direction, as shown in FIGURE 1, and thereby move the brake shoe 28 into engagement with the tread surface 31 of the wheel 11. When the valve 76 is operated to exhaust fluid from the cylinder 69 to atmosphere, the spring 78 acts to move the piston to its retracted position to thereby pivot the brake lever 34 in a counter-clockwise direction to move the brake shoe out of engagement with the tread surface 31 of the wheel 11.

When the brake mechanism is operated to move the brake shoe 28 relative to the wheel, the ratchet member 51 is also moved back and forth relative to the pawl 57. Prior to wear of the brake shoe, the pawl 57 is moved into and out of engagement with the same tooth 56 on the ratchet member. As the shoe 28 becomes worn to a reduced thickness, the ratchet member 51 moves closer to the wheel 11 during application of the brake and eventually causes the pawl to engage back of another tooth on the ratchet member and to rotate the latter through an arc corresponding to the distance between adjacent teeth during release movement of the brake.

The ratchet member 51 is thus moved step-by-step during wear of the brake shoe and acts through the gears 54 and 46 to rotate the adjusting nut 42 which acts to move the adjusting screw 47 outwardly from the housing 38 toward the wheel 11. The adjusting screw 47 is thus moved axially step-by-step from the housing 38 responsive to wear of the brake shoe to thereby reduce slack and maintain a predetermined range of travel of the brake shoe relative to the wheel tread 31.

If desired, the brake lever 34 may be provided at its upper end with an extension 81 adapted to be connected to a manually operative brake applying device.

I claim:

1. In slack adjuster for a railway car brake, a housing, an internally threaded nut journaled for rotational and non-axial movement in said housing, an adjusting screw in threaded engagement with said nut, a ratchet member journaled in said housing and provided with ratchet teeth, gear means interconnecting the nut and ratchet member for common rotational movement, a pawl mounted for reciprocative movement into and out of contact with said ratchet teeth to rotate said ratchet member responsive to movement of said housing transversely of the line of travel of the pawl, and an abutment screw on said housing operative responsive to movement of the housing in one direction to engage and move the pawl out of contact with said teeth.

2. In a slack adjuster for a railway car brake, a housing, an internally threaded nut journaled for rotational and non-axial movement in said housing, an adjusting screw in threaded engagement with said nut, a ratchet member journaled in said housing and provided with ratchet teeth, gear means interconnecting the nut and ratchet member for common rotational movement, a pawl mounted for reciprocative movement into and out of contact with said ratchet teeth to rotate said ratchet member responsive to movement of said housing transversely of the line of travel of the pawl, an abutment screw on said housing operative responsive to movement of the housing in one direction to engage and move the pawl out of contact with said teeth, and manually operative means to rotate said ratchet member when said pawl is out of contact with said ratchet teeth.

3. In a slack adjuster for a railway car brake, a housing, an internally threaded nut journaled for rotational and non-axial movement in said housing, an adjusting screw in the threaded engagement with said nut, a ratchet member journaled in said housing and provided with ratchet teeth, gear means interconnecting the nut and ratchet member for common rotational movement, a pawl mounted for reciprocative movement into and out of contact with said ratchet teeth to rotate said ratchet member responsive to movement of said housing transversely of the line of travel of the pawl, said pawl having an inclined cam surface, an abutment screw on said housing operative responsive to movement of the housing in one direction to engage said cam surface and move the pawl out of contact with said teeth, manually operative means to rotate said ratchet member when said pawl is out of contact with said ratchet teeth, and a compression spring to urge said pawl toward said ratchet teeth.

References Cited by the Examiner

UNITED STATES PATENTS

| 2,170,238 | 8/39 | Farmer | 188—82.3 X |
| 3,093,214 | 6/63 | Polanin | 188—203 |

FOREIGN PATENTS 346,950  4/31  Great Britain.

EUGENE G. BOTZ, *Primary Examiner.*

DUANE A. REGER, *Examiner.*